US008819405B2

(12) United States Patent  (10) Patent No.: US 8,819,405 B2
Martinent et al.  (45) Date of Patent: Aug. 26, 2014

(54) REMOTE ACCESS TO A MASS MEMORY AND A SECURITY MEMORY IN A PORTABLE COMMUNICATING OBJECT

(75) Inventors: Frëdëric Martinent, Marseilles (FR); Anthony Bord, Fuveau (FR); Franck Mosse, Berre l'Etang (FR)

(73) Assignee: Gemalto SA, Meudon (FR)

( * ) Notice: Subject to any disclaimer, the term of this patent is extended or adjusted under 35 U.S.C. 154(b) by 1333 days.

(21) Appl. No.: 12/161,984

(22) PCT Filed: Feb. 2, 2007

(86) PCT No.: PCT/EP2007/051039
§ 371 (c)(1),
(2), (4) Date: Dec. 15, 2008

(87) PCT Pub. No.: WO2007/088203
PCT Pub. Date: Aug. 9, 2007

(65) Prior Publication Data
US 2009/0222655 A1   Sep. 3, 2009

(30) Foreign Application Priority Data

Feb. 3, 2006 (FR) ...................................... 06 50401

(51) Int. Cl.
*H04L 29/06* (2006.01)

(52) U.S. Cl.
USPC ........... 713/150; 709/217; 709/238; 709/239; 709/240; 709/245; 726/4; 726/20

(58) Field of Classification Search
USPC ....................................................... 713/150
See application file for complete search history.

(56) References Cited

U.S. PATENT DOCUMENTS 5,590,197 A * 12/1996 Chen et al. ...................... 705/65
7,146,191 B2 * 12/2006 Kerner et al. ................. 455/558
(Continued)

FOREIGN PATENT DOCUMENTS

GB      2 384 403 A      7/2003
KR    2005-0120666     12/2005
(Continued)

OTHER PUBLICATIONS

Tonchev, T., 'NASLite+ for USB Flash User Manual', Tony Z. Tonchev (tzt@serverelements.com), Revision 1.1 Sep. 1, 2005, entire document, http://www.serverelements.com/bin/NASLite+_for_USB_Flash_User_Manual_r1.1_09-2005.pdf.*

(Continued)

*Primary Examiner* — Kambiz Zand
*Assistant Examiner* — Ronald Baum
(74) *Attorney, Agent, or Firm* — Buchanan Ingersoll & Rooney PC

(57) ABSTRACT

The invention relates to a system for remotely accessing a mass storage unit and a security storage unit in a portable communicating object. According to the invention, a terminal, such as a mobile device, which is associated with a portable communicating object, such as a multimedia smart card, includes an agent for facilitating access from a server to a mass storage unit capable of storing multimedia data and a security storage unit in the portable communicating object via a communication network. The agent establishes a single communication channel between the remote server and the terminal and processes data transmitted from one of the two elements including the server and one of the storage units of the portable communicating object to the agent so that the agent can transmit the data to the other of the two elements.

8 Claims, 6 Drawing Sheets

(56) References Cited

U.S. PATENT DOCUMENTS

| | | | |
|---|---|---|---|
| 7,152,160 B2* | 12/2006 | Lantto et al. | 713/168 |
| 7,272,723 B1* | 9/2007 | Abbott et al. | 713/185 |
| 7,343,619 B2* | 3/2008 | Ofek et al. | 726/2 |
| 7,533,271 B2* | 5/2009 | Laksono | 713/184 |
| 7,844,835 B2* | 11/2010 | Ginter et al. | 713/193 |
| 2002/0073340 A1* | 6/2002 | Mambakkam et al. | 713/202 |
| 2002/0091573 A1* | 7/2002 | Hodes | 705/17 |
| 2002/0095601 A1* | 7/2002 | Hind et al. | 713/201 |
| 2003/0018889 A1* | 1/2003 | Burnett et al. | 713/153 |
| 2003/0097571 A1* | 5/2003 | Hamilton et al. | 713/182 |
| 2003/0120957 A1* | 6/2003 | Pathiyal | 713/202 |
| 2004/0103275 A1* | 5/2004 | Ji et al. | 713/150 |
| 2004/0123113 A1* | 6/2004 | Mathiassen et al. | 713/185 |
| 2004/0181674 A1* | 9/2004 | Theimer | 713/182 |
| 2005/0055560 A1* | 3/2005 | Kendon | 713/189 |
| 2005/0066161 A1* | 3/2005 | Lin | 713/155 |
| 2006/0200681 A1* | 9/2006 | Kato et al. | 713/193 |
| 2006/0200864 A1 | 9/2006 | Nakanishi et al. | |
| 2006/0253894 A1* | 11/2006 | Bookman et al. | 726/2 |

FOREIGN PATENT DOCUMENTS

| | | |
|---|---|---|
| WO | 98/38820 A2 | 9/1998 |
| WO | WO 2005071558 A1 * | 8/2005 |

OTHER PUBLICATIONS

Notice of Preliminary Rejection issued in the corresponding Korean Patent Application No. 10-2008-7021541.

International Search Report for PCT/EP2007/051039, dated Aug. 2, 2007.

* cited by examiner

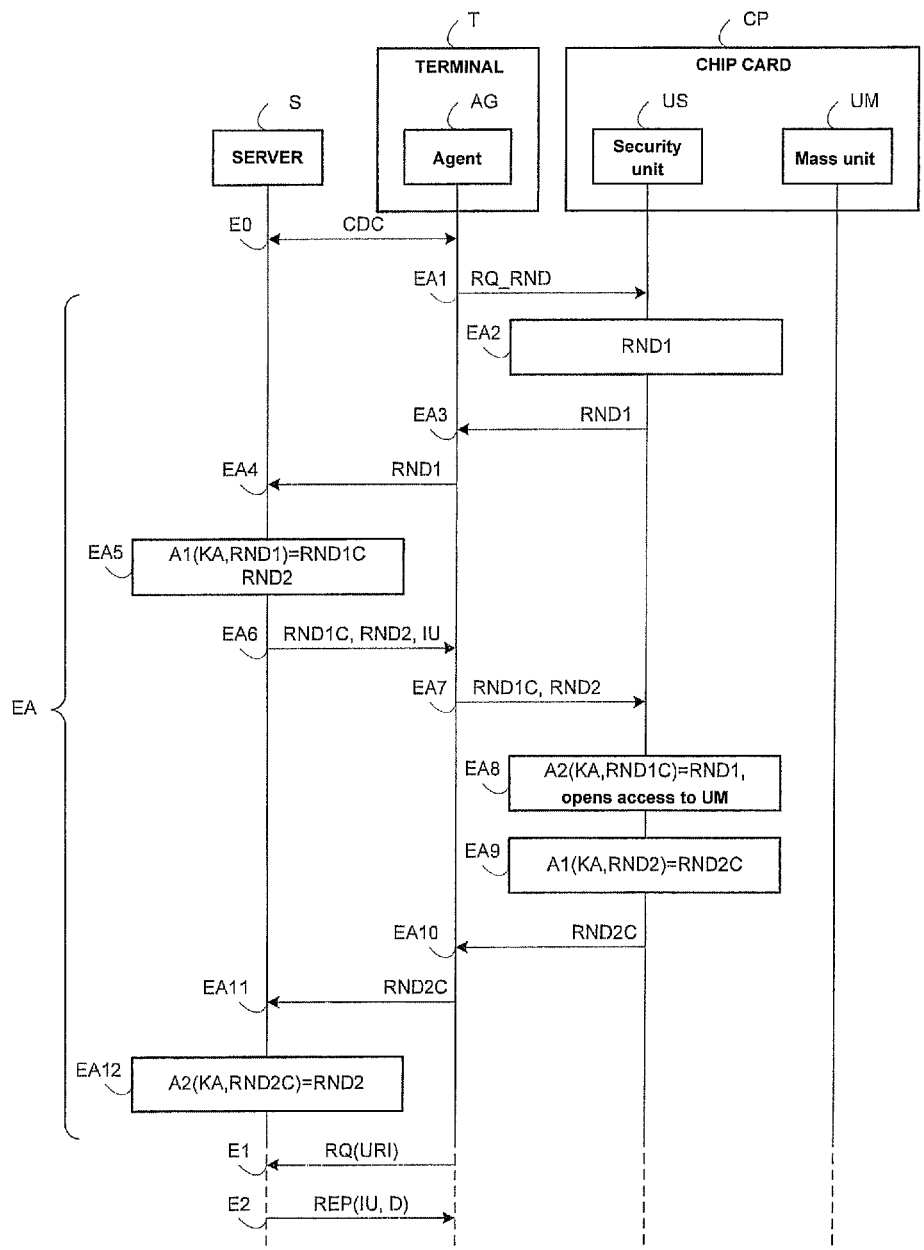

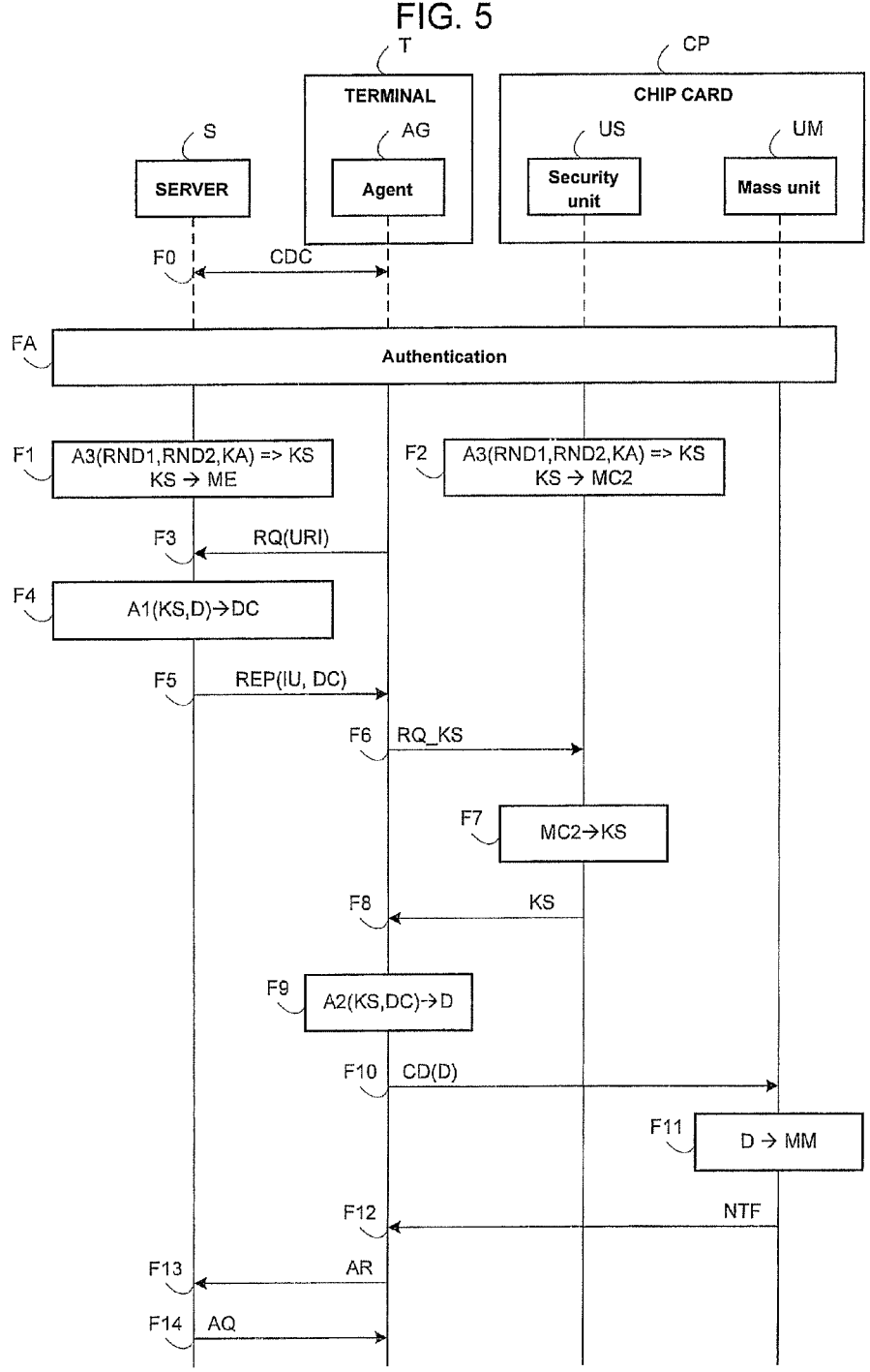

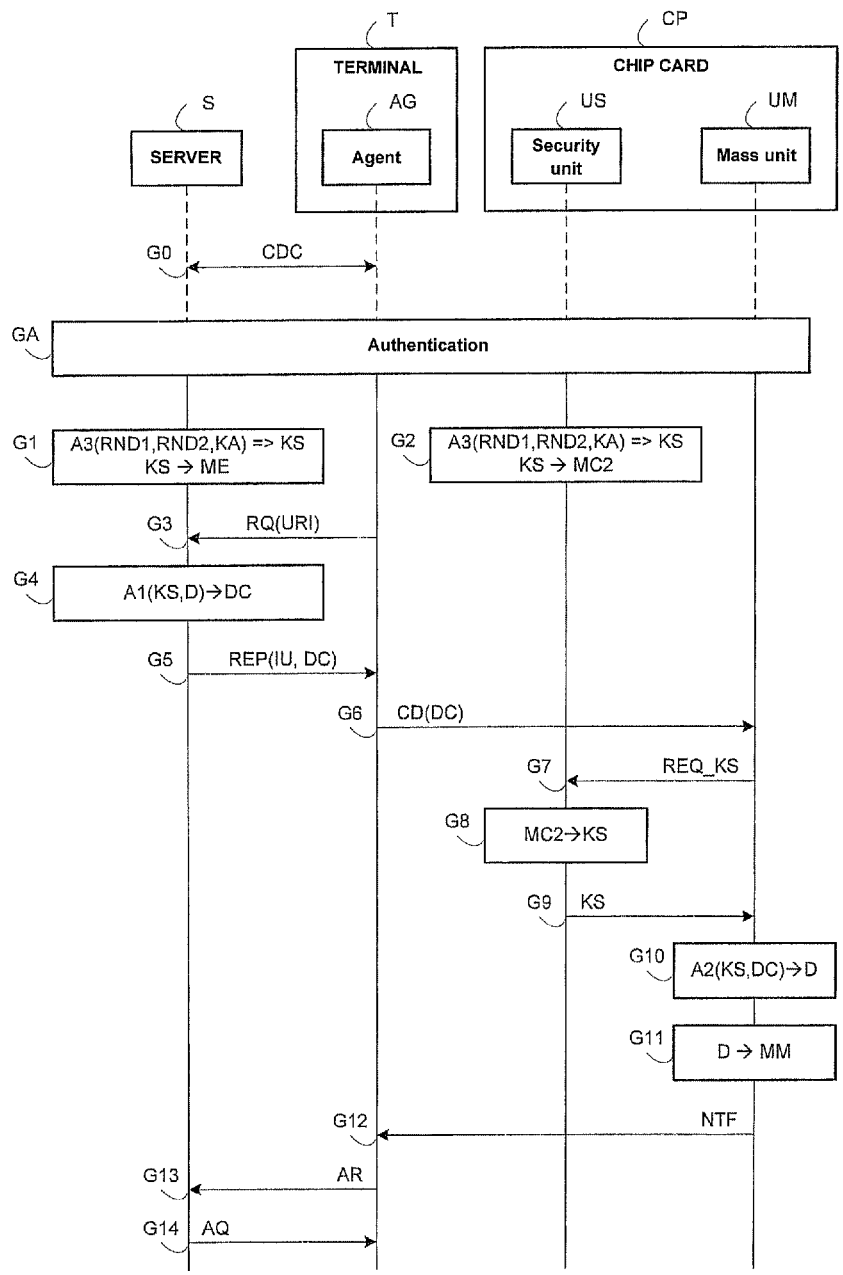

REMOTE ACCESS TO A MASS MEMORY AND A SECURITY MEMORY IN A PORTABLE COMMUNICATING OBJECT

The present invention relates to remote access by a single server to a mass memory and to a security memory, which are included in a portable communicating object with a high storage capacity which is associated with a terminal.

The portable communicating object has the special feature of comprising a mass memory unit which includes a memory controller and the mass memory, corresponding for example to a memory of a card of the "Flash Memory Card", "Secure Digital Card" or "Multi-Media Card" type, and a security unit such as a SIM (Subscriber Identity Module) or USIM (Universal Subscriber Identity Module) application of a UICC card (Universal Integrated Circuit(s) Card) comprising a security controller and an associated security memory.

This new technology considerably increases the size of the memory in the portable communicating object. This increases from 128 kilooctets to 128 megaoctets and could reach several gigaoctets. The increased size of the mass memory makes it possible to store therein all the multimedia data specific to a user of the communicating object, such as a multimedia telephone directory with photos and e-mail addresses, remotely downloaded music, photos, presentations for professionals, music.

Such an architecture which separately associates two controllers with two memories implies exclusive access to one of the two memories of the portable communicating object by a remote server. These accesses are respectively implemented by two communication channels between the server and the portable communicating object. A first communication channel which is not secure is managed by the terminal and comprises two transmission protocols. A first protocol of the OTA ("Over The Air") type relates to a transmission of data between the server and the terminal. A second protocol of the MMC ("Multi-Media Card") type relates to a rapid-access transmission of data between the terminal and the mass memory unit of the communicating object. A second communication channel comprises a secure, reliable and recognised single data transmission channel between a remote server and the security unit of the portable communicating object via the terminal, but provides less rapid access than the first protocol. For the second protocol, the terminal is then considered as a transparent router.

One major drawback of this technology is the fact that a remote server cannot simultaneously access the mass memory and the security memory of the portable communicating object. To do this, the server must set up two communication channels as described above.

The object of the invention is to remedy the aforementioned problem by making it easier for a remote entity, such as a server, to access both a mass memory and a security memory of a portable communicating object associated with a terminal.

In order to achieve this object, a method for remotely accessing a mass memory and a security memory in a portable communicating object by a server via a communications network, the portable communicating object being associated with a terminal, is characterised in that it comprises the following steps:

providing an agent in the terminal for routing data transfers between the remote server and one or the other of the memories of the portable communicating object,
  setting up a communication channel between the remote server and the agent in the terminal,
  transmitting data from one of the two elements comprising the server and one of the memories of the portable communicating object to the agent in the terminal, and
  processing the data transmitted to the agent so that the latter transfers the transmitted data to the other of the two elements.

For example, the portable communicating object is a multimedia chip card which includes a security unit comprising the security memory. Remote access to the mass memory by the server is then made secure by means of interactions between the security unit and the server via the agent in the terminal, prior to the transmission of data such as multimedia data.

Preferably, after the setting-up of the communication channel between the remote server and the terminal, there is an authentication between the server and the security unit of the portable communicating object by an exchange of secret data in order to authorise access to the mass memory of the portable communicating object by the server via the agent as soon as the authentication is confirmed.

According to a first embodiment, after the setting-up of the communication channel between the server and the terminal, the method of the invention furthermore comprises a transmission of a request by the agent to the security unit in order to obtain in response an encryption/decryption key, an encryption of the data by one of the two means comprising the server and the agent, a transmission of the encrypted data to the other of said two means, and a decryption of the encrypted data by said other of said two means.

According to a second embodiment, after the setting-up of the communication channel between the server and the terminal, the method of the invention furthermore comprises a transmission of a request by a controller of the mass memory included in the portable communicating object to the security unit in order to obtain in response an encryption/decryption key, an encryption of the data by one of the two means comprising the server and the mass memory controller, a transmission of the encrypted data to the other of said two means, and a decryption of the encrypted data by said other of said two means.

The invention also relates to a terminal associated with a portable communicating object so that a server can remotely access either the mass memory or the security memory in the portable communicating object via a communications network. The terminal is characterised in that it comprises an agent for routing data transfers between the remote server and one or the other of the memories of the portable communicating object, setting up a communication channel between the remote server and the terminal, and processing data transmitted from one of the two elements comprising the server and one of the memories of the portable communicating object to the agent so that the latter transfers the transmitted data to the other of the two elements.

Finally, the invention relates to a program capable of being implemented in the terminal according to the invention.

Other features and advantages of the present invention will become more clearly apparent on reading the following description of several preferred embodiments of the invention, which are given by way of non-limiting examples and with reference to the corresponding appended drawings, in which:

FIG. 4 is an algorithm for authorising access to a mass memory of a portable communicating object with a high storage capacity, according to the invention; and FIGS. 5 and 6 are algorithms for the secure transmission of data between a server and a mass memory unit of a portable communicating object, respectively according to two variant embodiments.

One preferred embodiment of the invention which is described below relates to the field of radiocommunications networks in which data can be transmitted between a multimedia content server or an administration server of a portable communicating object, and a terminal associated with a portable communicating object.

However, the invention can be applied to other fields relating to financial or banking data, medical data, etc.

Figure 1:
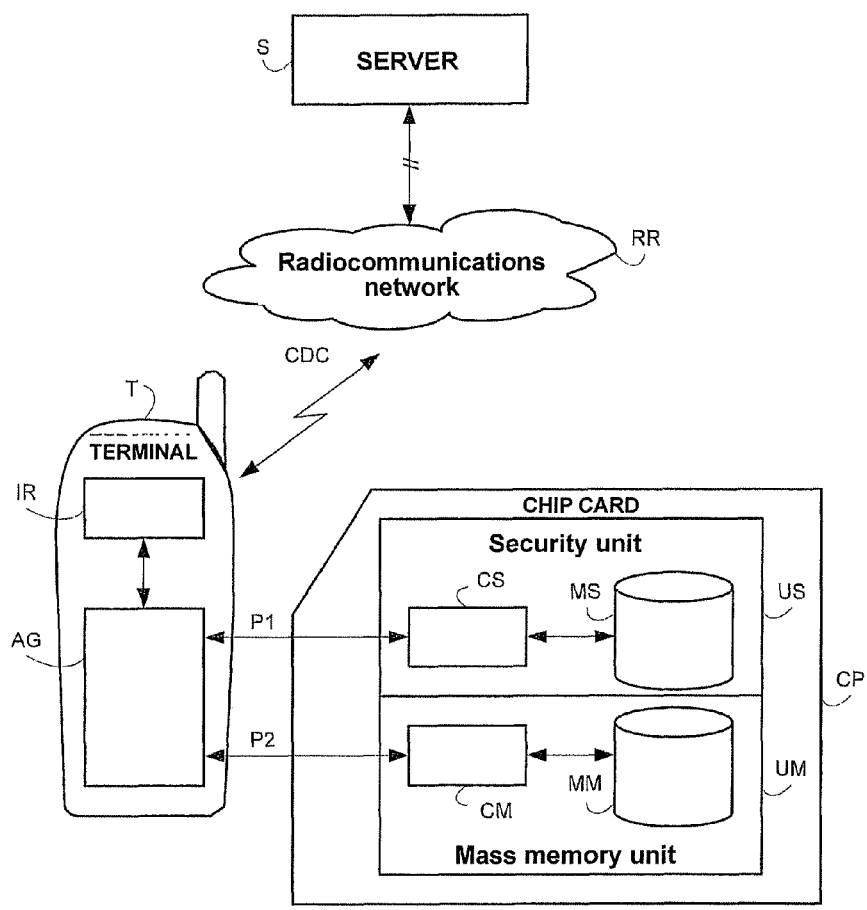
FIG. 1 is a schematic block diagram of a communication system according to one preferred embodiment of the invention, connecting a portable communicating object, a terminal and a server.
Figure 2:
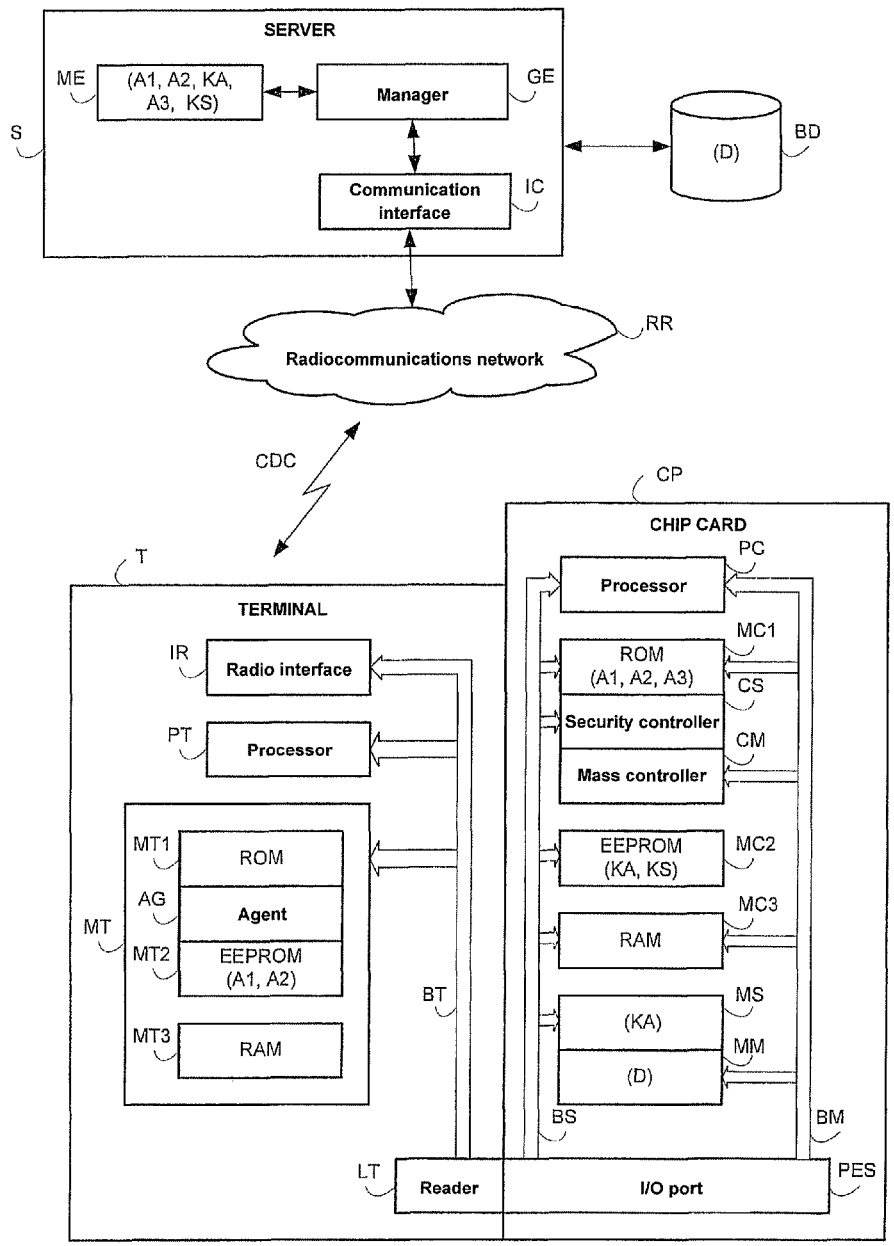
FIG. 2 is a more detailed schematic block diagram relating to FIG. 1.

With reference to FIGS. 1 and 2, a communication system according to the invention comprises a remote server S communicating via at least one radiocommunications network RR with a mobile terminal T associated with a portable communicating object with a high storage capacity, such as for example a chip card CP, to which reference will be made in the rest of the description. The radiocommunications network RR is of the UMTS type, of the GSM type based on a GPRS network, or of the WIFI, WIMAX, WIBRO type.

The three entities S, T and CP are shown in the form of functional blocks, most of which perform functions linked to the invention and may correspond to software and/or hardware modules.

The server S is a multimedia content server and/or a chip card administration server managed by an operator of the radiocommunications network RR, and constitutes an OTA ("Over The Air") platform.

With reference to FIG. 2, the server S comprises a manager GE, a memory ME and a communication interface IC. The server S is connected to or comprises a database BD.

The manager GE manages various operations during a transmission of data between the server S and the chip card CP or the terminal T, such as an authentication between the server and the chip card CP, a determination of a session key required for operations of encrypting and decrypting data exchanged between the server and the chip card or the terminal. The manager GE also allows the operator of the radiocommunications network RR to keep control of the chip card CP associated with the terminal T and to modify the content of the chip card. These operations at the initiative of the operator concern for example a downloading of a file, in particular a multimedia file, to chip cards, such as the card CP, from the equipment managed by the operator, and the downloading or deletion or modification of data from a file or a given application to at least the card CP.

The memory ME comprises an encryption algorithm A1, a decryption algorithm A2, an authentication key KA and a session key determination algorithm A3. The algorithm A3 determines a session key KS which is then stored in the memory ME.

The communication interface IC transmits and receives data at least via the radiocommunications network RR.

The database BD comprises, inter alia, data D, which may be multimedia data, and various parameters and characteristics of the chip card CP.

The chip card CP is a modern contact-based or contactless chip card with a high storage capacity. As shown in FIG. 1, it comprises two characteristic logic units. A first unit, referred to as the security unit US, comprises a first controller, called the security controller CS, and a first memory, called the security memory MS. A second unit, referred to as the mass memory unit UM, comprises a second controller, called the mass memory controller CM, and a second memory, called the mass memory MM, for storing data, such as multimedia data, which require a considerable storage space. The security controller and the mass memory controller are preferably logic modules in a common physical component. According to another example, the controllers are integrated in separate physical components which are connected to one another. The accesses to the memories MM and MS are separate and are respectively controlled by the controllers CS and CM. For example, the security unit US or more specifically the security controller CS cannot write data to the mass memory MM of the unit UM. Similarly, the mass memory controller CM cannot write data to the security memory MS of the unit US.

The mass memory unit UM is entirely controlled by the terminal T which commands the mass memory controller CM to write, read or delete multimedia data in the mass memory MM, which prevents the security controller CS from writing to the mass memory MM. The mass memory unit UM has functionalities and a structure which may be similar to those of a USB (Universal Serial Bus) key, or of a Flash Memory Card, or of a Secure Digital Card, or of a multimedia card of the MMC (Multi Media Card) type.

According to the preferred embodiment of the invention, the security controller CS of the security unit US is a SIM (Subscriber Identity Module) application when the associated terminal T is a mobile of the GSM or GPRS type, or a USIM (Universal Subscriber Identity Module), RUIM (Removable User Identity Module) or ISIM (IP Subscriber Identity Module) application, associated with a mobile terminal working in CDMA (Coded Division Multiple Access) of the third generation (3GPP) of the UMTS (Universal Mobile Telecommunications System) or UTRAN (UMTS Terrestrial Radio Access Network) type, or of the third generation (3GPP2) of the CDMA 2000 type. The security unit US can set up, in a known manner, a communication channel of the OTA type with the remote server S in order to transmit data in a transparent manner via the terminal T.

The security unit US constitutes a "security lock" of the mass memory unit UM and authorises or prohibits access to the mass memory unit UM as a function of an authentication between the server S and the security unit US by means of a shared authentication key KA. The security unit determines a session key KS necessary for encrypting and decrypting data D which are transmitted in encrypted form and thus in a secure manner between the server S and the terminal T or the chip card CP.

With reference to FIG. 2, a microcontroller of the chip card CP comprises a processor PC, or a plurality of processors, and three memories MC1 to MC3. The card receives commands or requests from the terminal T, and transmits responses to the terminal T, via an input/output port PES.

The memory MC1 is of the ROM or Flash type and includes the operating system of the card, the encryption algorithm A1, the decryption algorithm A2 and the algorithm A3 for determining the session key KS. The memory MC1 also comprises the security controller CS of the security unit US and the mass memory controller CM of the mass memory unit UM.

The memory MC2 is a non-volatile memory, for example of the EEPROM or Flash type, for storing in particular the authentication key KA, the session key KS once this has been determined, identity numbers and other parameters of the profile of the user in possession of the card, such as a PIN code and other security data. The memory MC2 can be accessed only by the security unit.

As a variant, the security memory MS comprises the content of the memory MC2.

The memory MC3 is a RAM or SRAM memory which serves more particularly for processing data.

The mass memory MM stores multimedia data exchanged with the server S.

According to a variant relating to the subsequent description of FIG. 6, the mass memory controller CM comprises the encryption algorithm Al and the decryption algorithm A2.

The processor P, the memory ROM, the security controller CS, the memories MC2 and MC3, the security memory MS and the port PES in the card are connected to one another by a bidirectional security bus BS. Similarly, the processor P, the memory ROM, the mass memory controller CM, the memory MC3, the mass memory MM and the port PES in the card are connected to one another by a bidirectional bus BM. According to the example of embodiment of the card shown in FIG. 2, the two controllers CS and CM are integrated in one and the same physical component.

The terminal T comprises a processor PT, memories MT, a radio interface IR and a card reader LT for communicating with the port PES of the chip card CP. The various elements of the terminal are connected to one another by a bidirectional bus BT.

The memories MT comprise three memories MT1, MT2 and MT3. The memory MT1 is of the ROM or Flash type and includes the operating system of the terminal T. The memory MT2 is a non-volatile memory, for example of the EEPROM or Flash type, and may comprise inter alia, according to a variant relating to the subsequent description of FIG. 5, the encryption algorithm Al and the decryption algorithm A2. The memory MT3 is a RAM or SRAM memory which serves more particularly for processing data.

The terminal T comprises, furthermore relating to the invention, an agent AG, which may be a software agent, distributed in the memories MT1 and MT2. The agent AG is an intermediate computer tool between the server S and the units US and UM of the chip card CP. The role of the agent AG is to route transmitted data either between the server and the controller CS of the security unit US of the card, or between the server and the controller CM of the mass memory unit UM of the card, particularly for multimedia data. The software agent AG sets up a single communication channel CDC of the OTA type with the remote server S which advantageously dialogues only with the agent AG in order to access one of the two units US and UM of the card. The server thus manages just a single communication protocol with the terminal.

The agent AG also takes charge of the problems regarding authentication between the server and the terminal associated with the chip card.

According to other examples, the terminal T is replaced by any terminal with which a chip card can communicate, and may be a portable device for transmitting messages, or a personal computer (PC) equipped with a chip card reader, or a fixed terminal such as a bank terminal which receives a debit or credit chip card. The network RR may then be coupled for example to an intranet, a wireless local network or the Internet.

The agent AG may also be integrated in a personal computer connected to a mobile terminal associated with the chip card.

The data are transmitted between the agent AG and the security unit US according to a protocol P1 of the HTTP (HyperText Transfer Protocol) type or any other type of protocol based on TCP/IP (Transmission Control Protocol/Internet Protocol) or, as a variant, according to the protocol defined by the specification ISO-7816 based on the APDU (Application Protocol Data Unit) commands. The data are transmitted between the agent AG and the mass memory unit UM according to the protocol P2 of the MMC ("Multi-Media Card") type.

The protocol for communication between the agent AG and the server S is based on requests and responses. For example, the agent AG transmits a request to the server in order to retrieve data stored in the database BD of the server. The request relates to an earlier request from the security unit or from the user of the terminal and contains a URI (Unified Resource Identifier) storage address, at which the requested data are stored in the database, and information indicating attributes of the data. In response to the request, the server transmits the data accompanied by information indicating the attributes of the data and an identifier IU relating to one of the two units US and UM in which the data must be stored in the card. The agent AG analyses the received information and specifically processes the data depending on the unit for which they are destined. If the data are destined for the security unit, the agent transmits the data to the security controller via the protocol P1 which will process them in turn. If the data are destined for the mass memory unit, the agent commands, via the protocol P2, the writing, reading or deletion thereof in the mass memory MM of the unit UM.

Two modes of communication are considered between the agent and the server.

According to a first mode of communication, a request containing the URI address relating to the data is sent beforehand by the agent AG and, in response to the request, the requested data are transmitted by the server S to the agent AG, which routes them towards one of the two units US and UM of the card.

In a second mode, data are downloaded from the server to the agent AG, which routes the downloaded data to one of the two units US and UM of the card. The agent AG initiates the download by sending a request to the server indicating whether data are to be downloaded. In response, the server S transmits the URI addresses at which the data to be downloaded are stored. For each URI address transmitted, the agent AG transmits a request containing the URI address to the server. In response, the server transmits the requested data read from the database and designated by the transmitted URI address.

Figure 3:
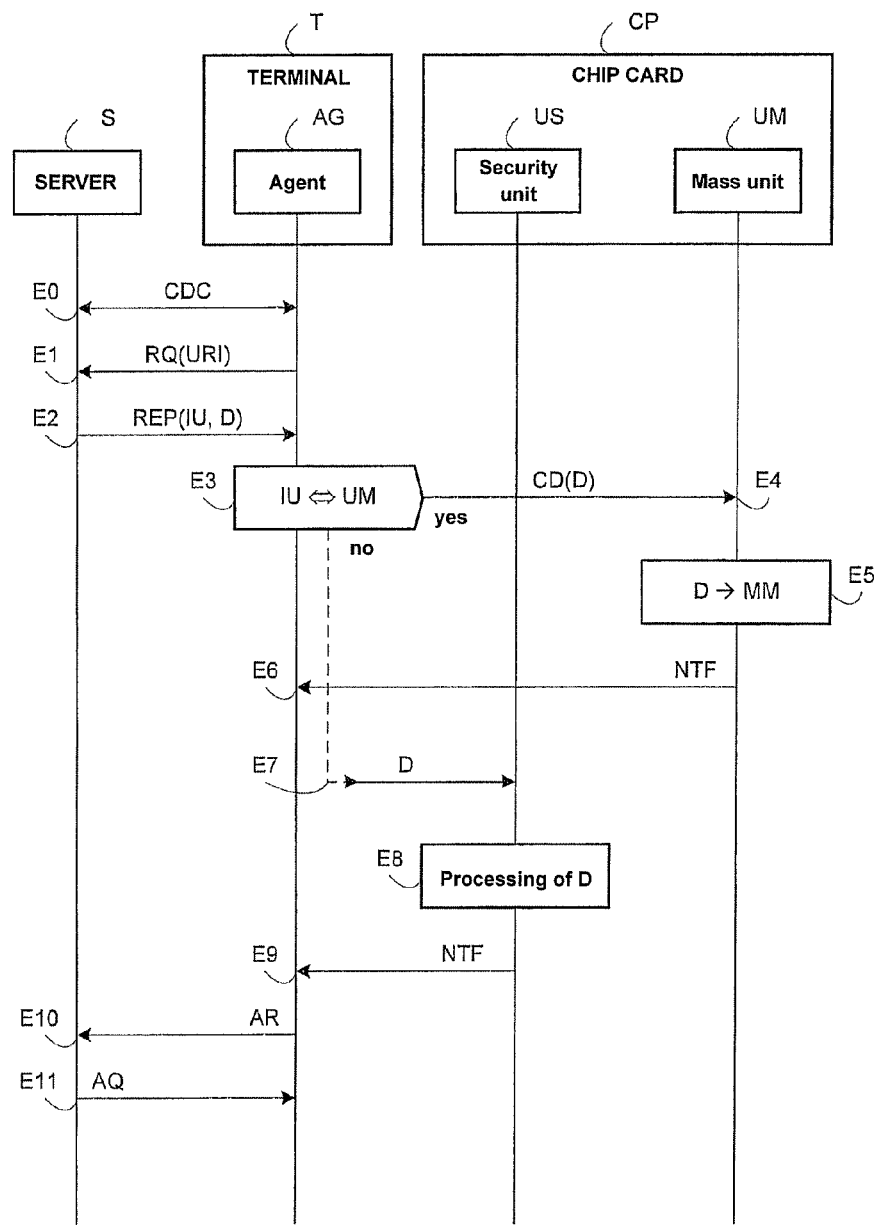
FIG. 3 is an algorithm of a method for remotely accessing a mass memory unit and a security unit of a portable communicating object, according to the invention.

One example of embodiment of the method according to the invention with reference to FIGS. 3 and 4 concerns more particularly an updating of data D supplied according to the first mode of communication by the server S to one of the units UM and US of the chip card.

With reference to FIG. 3, one embodiment of the method according to the invention comprises steps E0 to E11 for managing data transfers from the remote server S to one of the units UM and US.

In the initial step E0, the agent AG of the terminal T commands the setting-up of a communication channel CDC with the server S via the radiocommunications network RR, for example in response to a short message SMS in push mode which is sent by the server S in order to trigger an updating of data D in one of the memories MM and MS of the chip card. All the transmissions between the agent AG and the server S are executed respectively via the radio interface IR of the terminal and the communication interface IC of the server S.

In step E1, the agent AG transmits a request RQ to the server containing a URI address identifying the data to be retrieved which are stored in the database BD of the server.

In step E2, the manager GE of the server S transmits to the agent AG a response containing the data D and an identifier IU indicating the unit US or UM of the card for which the data D are destined. The agent AG compares the identifier IU with the identifiers of the units US or ME, in step E3.

If the identifier IU corresponds to that of the mass memory unit UM, the agent AG processes the data D, in step E4, in order to suitably transmit them to the mass memory controller CM of the unit UM with a command CD to write the data D to the mass memory MM. In step E5, the controller CM writes the data D to the mass memory MM and then transmits a notification NTF to the agent AG of the terminal, reporting the correct or incorrect status of the write operation that has been carried out.

If the writing to the mass memory MM is incorrect, the agent AG restores the data in order to carry out a check between the data stored in the database DB and the mass memory, when the server S is a card administration server.

If, in step E3, the identifier IU corresponds to that of the security unit US, the agent transmits the data D to the security unit US via the protocol P1, in step E7. The security controller CS processes the data D in step E8, for example by writing them to the security memory MS. The security controller then transmits, in step E9, a notification NTF to the agent AG of the terminal, reporting the correct or incorrect status of the transmission that has been carried out.

In step E10, the agent AG transmits an acknowledgement of receipt AR to the server S, which responds to it with an acknowledgement AQ in step E11.

According to one variant embodiment of the method of the invention, shown in FIG. 4, the method comprises an authentication step EA inserted between the steps ED and EI described above. The authentication step concerns an authentication between the server S and the security unit US of the chip card, and comprises the steps EA1 to EA12. Initially, access to the mass memory unit UM is locked by the security unit US, which authorises or prohibits the opening of this access depending on the result of the authentication. This locking or unlocking of access to the mass memory unit by the security unit is possible since the two controllers CS and CM of these two units form part of one and the same physical component as shown in FIG. 2, or of two separate physical components which are connected to one another.

In step EA1, the agent AG of the terminal T transmits to the security unit US of the chip card a request RQ_RND to obtain a random number RND. The security unit US generates in step EA2 a random number RND1 and transmits it to the agent AG in step EA3. The latter sends the random number RND1 to the manager GE of the server S in step EA4. The manager GE encrypts the random number RND1 by applying thereto an encryption algorithm Al which is dependent on the authentication key KA, and produces an encrypted first random number RDN1C.

Conversely, in step EAS, the manager GE generates a second random number RND2. In step EA6, the encrypted first random number RND1C and the second random number RND2 are sent, optionally with an identifier IU indicating the security unit, to the agent AG of the terminal which verifies the identifier IU and routes the random numbers to the security unit US, in step EA7. In step EA8, the security unit US decrypts the received random number RND1C by applying thereto a decryption algorithm A2 which is the inverse of the encryption algorithm Al and is dependent on the authentication key KA stored in the security unit. The security unit compares the decrypted random number with the random number RND1 generated in step EA2. If the two random numbers are identical, the authentication of the server by the security unit is confirmed, and the security controller of the security unit authorises access by the server to the mass memory unit UM via the software agent AG. If the two random numbers are not identical, access to the mass memory unit remains locked and the security unit generates a new random number to be transmitted to the server in order to restart steps EA2 to EA8.

For a simple authentication of the server by the security unit, the authentication step stops at step EA8 and the method continues at step E1 so that the terminal receives the data D.

For a mutual authentication between the security unit and the server, step EA8 is followed by step EA9, during which the security unit US encrypts the second random number RND2 which was generated by the manager GE of the server S in step EA5. The security unit applies to the random number RND2 an encryption algorithm Al which is identical to that in the manager GE and which is dependent on the authorisation key KA. Then, in step EA10, the security unit transmits to the agent AG the encrypted second random number RND2C, which it sends to the manager GE in step EA11.

In step EA12, the manager GE decrypts the random number RND2C by applying thereto the decryption algorithm A2 which is identical to that in the security unit and is dependent on the authentication key KA. The manager GE compares the decrypted random number with the random number RND2 generated in step EA5. If the two random numbers are identical, the mutual authentication is confirmed and the method continues at step E1 so that the terminal receives the data D. If not, the manager generates a new random number to be transmitted to the security unit in order to restart steps EA5 to EA12.

Two variants concerning a secure transmission of the multimedia data D between the server S and the mass memory unit UM are shown respectively in FIGS. 5 and 6.

With reference to FIG. 5, the method of the invention comprises steps F0 to F14. Step F0 is an initial step analogous to the initial step E0 described with reference to FIG. 3, and a step FA following the step F0 is analogous to the authentication step EA described with reference to FIG. 4.

In steps F1 and F2, which are carried out respectively by the manager GE of the server S and the security controller CS of the security unit US, a session key KS is determined by applying the exchanged random numbers RND1 and RND2 and the authentication key KA to the algorithm A3. The key KS is stored in the memory ME of the server, and in the memory MC2 or MS of the chip card CP.

In step F3, the agent AG transmits a request RQ to the server containing a URI address identifying the data to be retrieved which are stored in the database BD of the server.

In step F4, the manager GE searches for the multimedia data D in the database according to the URI address, and encrypts them by applying an encryption algorithm Al, which may or may not be identical to that used in steps EA5 and EA9 and is dependent on the session key KS determined in step F1, so as to produce encrypted multimedia data DC. These data are transmitted to the agent AG and are included in a response REP which also contains an identifier IU indicating the unit UM, in step F5.

The agent AG receives the encrypted data DC and transmits a request RQ_KS to the security unit US in step F6 in order to obtain the session key KS necessary for decrypting the data DC. In step F7, the security unit searches the memory MC2 or the security memory MS for the key KS determined in step F2, and transmits it to the agent AG, in step F8.

In step F9, the agent AG decrypts the data DC by applying the decryption algorithm A2, which may or may not be identical to that used in steps EA8 and EA12 and is dependent on the transmitted key KS, so as to produce the decrypted multimedia data D. In this variant for decrypting data D, the algorithm A2 is stored in the memory MT2 of the terminal T.

The data D are then processed in steps F10 to F14 in a manner analogous to steps E4 to E6 and E10 and E11 described with reference to FIG. 3.

With reference to FIG. 6, the method according to the other variant for secure transmission of the multimedia data D between the server S and the mass memory unit UM comprises steps G0 to G14.

Steps G0 to G5 are analogous to steps F0 to F5 described above.

In step G6, the agent AG transmits a command to write data CD accompanied by encrypted multimedia data DC to the mass memory unit UM.

In step G7, the mass memory controller CM transmits a request REQ_KS to the security unit in order to obtain the session key KS. The transmission of the request is set up via software between the controller CM and the controller CS since the two controllers are logic modules in a common physical component or in two separate physical components which are connected to one another.

In step G8, the security unit US searches the memory MC2 or the security memory MS for the key KS determined in step G2, and transmits it to the mass memory unit UM, in step G9.

In step G10, the mass memory controller CM decrypts the data DC by applying the decryption algorithm A2, which may or may not be identical to that used in steps EA8 and EA12 and is dependent on the transmitted key KS, so as to produce the decrypted multimedia data D. In this variant for decrypting data D, the algorithm A2 is stored in the mass memory controller CM of the unit UM.

Steps G11 to G13 are then identical to steps E4 to E6 described with reference to FIG. 3.

Conversely to the embodiment described above, another embodiment of the method for remotely accessing the mass memory concerns an updating of multimedia data in the database BD of the server S, the data originating from the mass memory of the unit UM. In this other embodiment, it is the agent AG which transmits encrypted or non-encrypted data to the server in order to store them in the database BD connected to the server. For example, the agent AG transmits a telephone directory which includes photos and is stored in the mass memory, which makes it possible for the user of the chip card to retrieve all his contacts after renewing or losing the chip card.

In this other embodiment, the multimedia data are encrypted, instead of being decrypted, either by the agent AG of the terminal or by the mass memory controller CM according to one of the two variants for secure transmission of the data. In these two variants, the entity AG, CM which encrypts multimedia data transmits a request RQ_KS, REQ_KS to the security unit US in order to obtain the session key KS necessary for encrypting the data.

The invention is not limited to the field of telecommunications. The portable communicating object may be a USB (Universal Serial Bus) key for exchanging confidential data stored in the mass memory of the key to which secure access is managed by the security unit of the USB key.

The portable communicating object may be a health card comprising a mass memory unit which includes digital X-rays or analysis reports for the patient carrying the card, these multimedia data being exchanged between health professionals who have access thereto after an authentication managed by the security unit of the health card.

In the field of copyright protection, a portable communicating object may contain in its mass memory multimedia data relating to a film, a video clip or a literary work, the access rights to which are managed by the security unit.

The invention may also apply to the banking field, for example, for the periodic and secure transmission of transactions carried out beforehand and recorded in the mass memory.

According to a first use of the invention, a multimedia application is divided into several components. Each application component is stored as a function of its characteristics. The components which do not require any particular security are stored in the terminal. The application components which require a high level of security and a limited memory space are stored in the security unit. The application components which require a considerable memory space and a level of security managed by the security unit are stored in the mass memory.

According to a first example relating to the first use, a multimedia telephone directory application may be divided into two application components:

the names and telephone numbers of the contacts stored in the security unit, and the photos of the contacts stored in the mass memory unit.

Thus, if the portable communicating object is connected to a terminal which does not comprise an agent making it possible to access the mass memory in a secure manner, the user will be able to access in the conventional manner the names and telephone numbers of the contacts included in the security unit.

According to a second example of the first use, another type of multimedia application may comprise the following components: a management engine which manages the display of the multimedia application, an application logic which is the core of the application and which requires controlled access and a high level of security, and the multimedia data requiring rapid access. Thus, the management engine is stored in the terminal, the application logic is stored in the security unit and the multimedia data are stored in the mass memory of the mass memory unit.

One example of such an application is a video game. The man/machine interface of the game is managed by the terminal. The game logic serving for example for calculating scores, for changing from one background to another depending on scores obtained, etc., is stored in the security unit. The multimedia data necessary for displaying the backgrounds, the characters, etc., are stored in the mass memory.

According to a second use of the invention, a radiocommunications network operator ends the multimedia personalisation of the portable communicating object as a function of the profile of the user just before the object is delivered to said user. This use allows a more precise management of the operator's stocks of portable communicating objects. For example, when the portable communicating object is delivered, the operator's server S transmits the multimedia content corresponding to the subscriber's profile in order to store it in the mass memory. According to another example, the mass memory contains the multimedia contents of the various user profiles at the time of manufacture of the portable communicating object in the factory. Prior to delivery of the portable communicating object, one content is selected depending on the user profile, and the other contents are deleted.

According to another example of embodiment of the invention, the server S may be a personal computer (PC) connected to the terminal T via a wired connection of the series connection or USB connection type, or via a wireless connection of the Bluetooth, WIFI, infrared (IrDA: Infrared Data Association) or ZigBee type.

According to yet another example of embodiment of the invention, a personal computer (PC) serves as a gateway between the server and the terminal. The server S communicates with the computer via a communication network of the Internet type, and the computer communicates with the terminal via a wireless connection of the Bluetooth, WIFI, infrared (IrDA: Infrared Data Association) or ZigBee type.

The invention described here relates to a method and a terminal T associated with a portable communicating object CP so that a server S can remotely access via a single communication channel a mass memory MM capable of storing multimedia data and a security memory in the portable communicating object CP via a radiocommunications network RR. According to one preferred embodiment, the steps of the method of the invention are determined by the instructions of a computer program incorporated in particular in the terminal. The program comprises program instructions which, when said program is loaded and run in the terminal, of which the operation is then controlled by the running of the program, carry out the steps of the method according to the invention:
- providing an agent in the terminal for routing data transfers between the remote server and one or the other of the memories of the portable communicating object,
- setting up E0 a communication channel between the remote server and the agent in the terminal,
- transmitting E1 data from one of the two elements comprising the server and one of the memories of the portable communicating object to the agent in the terminal, and
- processing E2 the data transmitted to the agent so that the latter transfers the transmitted data to the other of the two elements.

Consequently, the invention also applies to a computer program, in particular to a computer program on or in a data medium, suitable for implementing the invention. This program may use any programming language and may be in the form of source code, object code or intermediate code between source code and object code, such as in a partially compiled form, or in any other form desirable for implementing the method according to the invention.

The invention claimed is:

1. A method for remotely accessing a mass memory and a security memory in a portable communicating object by a server, via a communications network, the portable communicating object interfacing with a terminal, comprising the following steps:
   providing an agent in the terminal for routing data transfers between the remote server and either the mass memory or the security memory of the portable communicating object;
   setting up a single communication channel between the remote server and the agent in the terminal by which data is communicated via a predetermined communication protocol;
   securing remote access to the mass memory by the server through interactions between a security unit, which comprises the security memory, and the server via the agent in the terminal, prior to the transmission of data;
   after setting up the communication channel between the server and the terminal, transmitting a request by a controller of the mass memory included in the portable communicating object to the security unit to obtain an encryption/decryption key;
   for data transmitted between the server and the mass memory, encrypting the data by one of the server and the mass memory controller, transmitting the encrypted data to the other of the server and the mass memory controller, and decrypting the encrypted data by said other of the server and the mass memory controller;
   receiving, at the agent, via the single communication channel, data from the remote server to be routed to one of the mass memory via a first communication protocol and the security memory of the portable communicating object via a second communication protocol, different from the first communication protocol; and
   based on content of said received data, determining, by the agent in the terminal, which one of the mass memory and the security memory of the portable communicating object, said received data is to be routed;
   wherein when the agent determines that said received data is to be routed to said mass memory, the method further includes the steps of:
      processing, by the agent, said received data, so that the data is configured to be transmitted to the mass memory according to the first communication protocol; and
      transmitting, by the agent, the processed data to the mass memory via said first communication protocol, and
   when the agent determines that said received data is to be routed to said security memory, the method further includes the steps of:
      processing, by the agent, said received data, so that the data is configured to be transmitted to the security memory according to the second communication protocol; and
      transmitting, by said agent, said processed data to the security memory via the second communication protocol.

2. The method according to claim 1, comprising, after the setting-up of the communication channel between the remote server and the terminal, an authentication between the server and the security unit of the portable communicating object by an exchange of secret data in order to authorize access to the mass memory of the portable communicating object by the server via the agent as soon as the authentication is confirmed.

3. The method according to claim 1, comprising, after the setting-up of the communication channel between the server and the terminal, a transmission of a request by the agent to the security unit in order to obtain in response an encryption/decryption key, an encryption of the data by one of the server and the agent, a transmission of the encrypted data to the other of the server and the agent, and a decryption of the encrypted data by said other of the server and the agent.

4. The method of claim 1 wherein the mass memory and the security memory are separately controlled by respective mass memory and security memory controllers.

5. A system that enables a server to remotely access memory in a communicating object, via a communications network, comprising:
   a portable communicating object having a mass memory and a security memory; and
   a terminal interfacing with said portable communicating object, said terminal including:
      an agent configured to:
         (i) route data transfers between the remote server and either the mass memory or the security memory of the portable communicating object,
         (ii) set up a communication channel between the remote server and the terminal by which data is communicated via a predetermined communication protocol, and
         (iii) determine which one of the mass memory and the security memory of the portable communicating object, data received from the server is to be routed, based on content of said received data, wherein remote access to the mass memory by the server is secured through interactions between a security unit, which comprises the security memory, and the server via the agent in the terminal, prior to the transmission of data;

after setting up the communication channel between the server and the terminal, a controller of the mass memory included in the portable communicating object transmits a request to the security unit to obtain an encryption/decryption key; and for data transmitted between the server and the mass memory, the data is encrypted by one of the server and the mass memory controller, the encrypted data is transmitted to the other of the server and the mass memory controller, and the encrypted data is decrypted by said other of the server and the mass memory controller; and wherein when the agent determines that said received data is to be routed to said mass memory, the agent is configured to:

(a) process said received data so that the data is configured to be transmitted to the mass memory according to the first communication protocol, and (b) transmit said data to the mass memory according to the first communication protocol, and when the agent determines that said received data is to be routed to said security memory, the agent is configured to:

(a) process said received data so that the data is configured to be transmitted to the security memory according to the second communication protocol, and (b) transmit said data to the security memory according to the second communication protocol.

6. A method for remotely accessing a mass memory and a security memory in a portable communicating object by a server via a communications network, the portable communicating object being associated with a terminal, comprising the following steps:

providing an agent in the terminal for routing data transfers between the remote server and either the mass memory or the security memory of the portable communicating object;

establishing a single communication channel between the remote server and the agent in the terminal by which data is communicated via a predetermined communication protocol;

securing remote access to the mass memory by the server through interactions between a security unit, which comprises the security memory, and the server via the agent in the terminal, prior to the transmission of data;

after setting up the communication channel between the server and the terminal, transmitting a request by a controller of the mass memory included in the portable communicating object to the security unit to obtain an encryption/decryption key;

for data transmitted between the server and the mass memory, encrypting the data by one of the server and the mass memory controller, transmitting the encrypted data to the other of the server and the mass memory controller, and decrypting the encrypted data by said other of the server and the mass memory controller;

receiving, at the agent, data from the mass memory of the portable communicating object via a first communication protocol and the security memory of the portable communicating object via a second communication protocol that is different from the first communication protocol;

processing the data, independent of the memory from which the data is received, so that the received data is configured to be transmitted to the server via the predetermined protocol of the single communication channel; and transferring the processed data, via the single communication channel, to the server.

7. The method of claim 6, further comprising:

receiving, at the agent, data from the remote server to be routed to one of the mass memory and the security memory of the portable communicating object; and determining, by the agent, which one of the mass memory and the security memory of the portable communicating object, said received data is to be routed, based on content of said received data.

8. The method of claim 7, further comprising:

transmitting the received data to one of the mass memory via the first communication protocol and the security memory via the second communication protocol, on a basis of said routing determination.

* * * * *